United States Patent [19]

Esteban

[11] 3,737,636

[45] June 5, 1973

[54] NARROW BAND DIGITAL FILTER

[75] Inventor: Daniel Jacques Esteban, La Gaude, France

[73] Assignee: International Business Machines Corp., Armonk, N.Y.

[22] Filed: May 3, 1972

[21] Appl. No.: 249,832

[30] Foreign Application Priority Data

May 13, 1971 France....................7118314

[52] U.S. Cl.....................235/152, 328/167

[51] Int. Cl.....................G06f 7/38

[58] Field of Search....................235/152, 156, 150.4; 328/165, 167

[56] References Cited

UNITED STATES PATENTS

| | | | |
|---|---|---|---|
| 3,633,170 | 1/1972 | Jones | 340/172.5 |
| 3,639,739 | 2/1972 | Golder | 235/152 |
| 3,639,848 | 2/1972 | Elliott | 328/167 |
| 3,676,654 | 7/1972 | Melvin | 235/152 |

*Primary Examiner*—Eugene G. Botz
*Assistant Examiner*—David H. Malzahn
*Attorney*—Robert B. Brodie, Dewey J. Cunningham and J. Jancin Jr.

[57] ABSTRACT

A narrow band digital filter is formed by sampling the output sequence of the filter means at a frequency $F_i$ and recirculating the sampled sequence N times such that for the $I^{th}$ recirculation $F_i = F/n^i$ where $i = 1, 2, \ldots N$; n is an arbitrary real positive integer and F is the digit rate of the sequence originally applied to the filter. Thus, the output sampling rate of the $i^{th}$ circulation is $1/n$ times less than the $i^{th}$—1 circulation.

3 Claims, 6 Drawing Figures

NARROW BAND DIGITAL FILTER

BACKGROUND OF THE INVENTION

This invention relates to digital filters, and more particularly, to narrow band digital filters of the recirculating type employing a multi-stage delay element.

Mathematical filter theory shows that the filtered signal in the time domain is obtained by a convolution operation between the input signal to be filtered and the pulse response of the filter. An approximation of the result can be determined by carrying out this convolution in a discontinuous manner. For this purpose, the signal to be filtered is sampled, its successive samples are transmitted through a delay line. Then, the filtered signal samples are periodically obtained by weighting the delayed samples and by adding the weighted values. In the case of a transversal filter, the weighting factors correspond to the samples of the filter impulse response. Thus, it appears that the higher the number of weighting factors, then the more accurate the filtering. In principle, the impulse response sampling is performed at the same frequency as the signal sampling and a tap on the delay line corresponds to each obtained factor. As the impulse response of the filter decreases, then the value of the weighting factors decreases as the distance from the origin increases. The weighting factors become less and less significant and can be neglected from a certain rank without appreciable prejudice. However, the rank from which this truncating operation can be performed depends on the required filtering characteristics. In effect, for a same sampling frequency, the narrower is the bandwidth of a transversal filter, the more numerous are its significant factors. Therefore, it is of interest to use a device the bandwidth of which is wide at the beginning and can be subsequently narrowed in a simple manner without modifying the number of weighting factors.

In the case of a recursive filter, the number of weighting factors is indepenent of the sampling frequency, but their definition is directly linked to said frequency, said definition being more accurate as either the bandwidth is narrow or the sampling rate is high.

SUMMARY OF THE INVENTION

It is an object of this invention to devise a narrow band filter from a wide band filter such as a transversal or recursive filter without modifying either the number or the values of the weighting factors in such filter types.

The invention contemplates a narrow band digital filter comprising a recirculating type digital filter means, means for serially applying digital sequences representative of analog signal samples to the filter means input at a predetermined digit rate F, and means for sampling the filter means output sequence associated with the input sequence at frequency $F_i$ and for recirculating the output sequence N successive times, such that for the $i^{th}$ recirculation $F_i = F/_n i$ where $i = 1, 2, 3, \ldots$ N, and $n$ is an arbitrary positive real integer. Restated, the narrow band filter is obtained from a filter having $n^N$ times wider bandwidth than that required for the digital filter output. If F represents the Nyquist rate at which digits are sampled from an analog signal and applied to the filter input, then the corresponding filter output is sampled at a frequency $1/n$ times less and then recirculated or reapplied to the filter. This is repeated until the desired narrow bandpass is achieved.

DESCRIPTION OF THE PREFERRED EMBODIMENT

Figure 1:
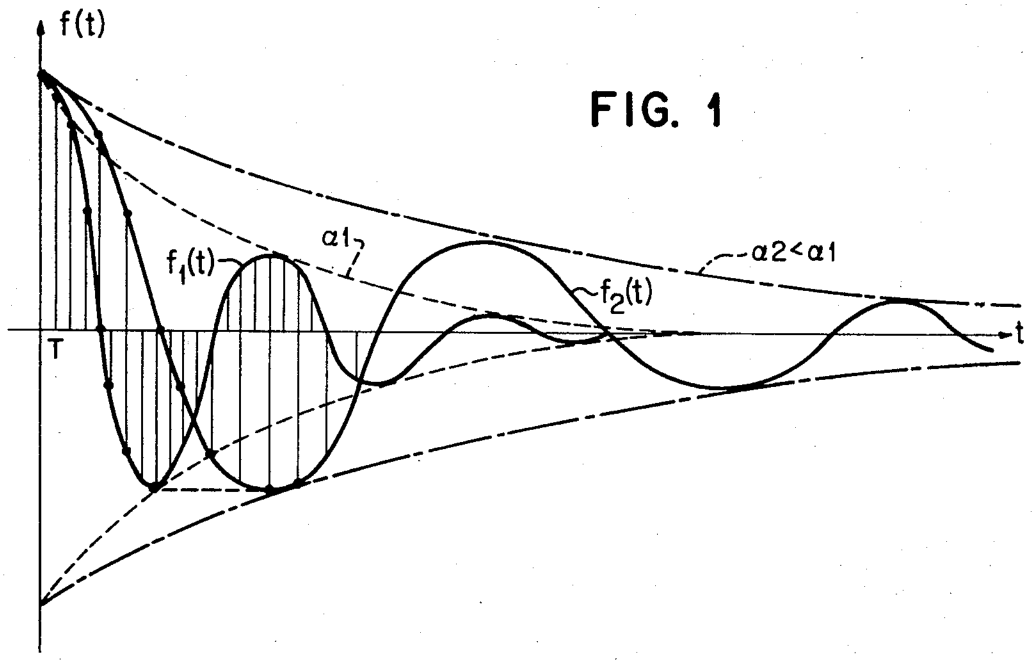
FIG. 1 shows impulse responses of filters with various bandwidths.

The understanding of the phenomena involved in this invention is made easier by recalling certain mathematical properties.

Let $f(t)$ be the impulse response of a second order filter such that:

$$f(t) = Ae^{-\alpha t} \quad \cos(\Omega t + \phi) \qquad (1)$$

This expression means that the filter energized by a square pulse will deliver, at its output, an exponentially decreasing signal $f(t)$ of sinusoidal shape having the following characteristics:

| | |
|---|---|
| Initial amplitude | A |
| Exponential decay | $\alpha$ in 1/seconds |
| Angular frequency | $\Omega$ radians/second |
| Initial phase | $\phi$ radians |

These parameters enable the filter to be defined.

The transfer function of the filter is provided by the Laplace's transform $H(p)$ for the expression $f(t)$ and given by the following relation $$H(p) = \int_0^\infty f(t)\ e^{-pt} dt$$

or, taking conventional relation $e^{jx} = \cos x + j \sin x$ into account, $$H(p) = \text{Real} \int_0^\infty Ae^{-\alpha te} - j(\Omega t + \phi) \cdot e^{-pt} dt$$

$$H(p) = \text{Real}\ [(Ae{-}j\phi)/(p{+}\alpha){+}j\Omega]$$

$$H(p) = A\ [(\alpha \cos \phi - \Omega \sin \phi + p \cos \phi)/(p + \alpha)^2 + \Omega^2] \qquad (2)$$

Other useful characteristics of the filter are deduced from its transfer function (2) by using the following expressions:

$$\left.\begin{array}{ll} \text{Q-factor} & Q = \omega o/2\alpha \\ \text{Central frequency} & Fo = \omega o/2\pi = \sqrt{\Omega^2 + \alpha^2} \\ \text{Bandwidth} & B.P = Fo/Q = \alpha/\pi \end{array}\right\} \quad (3)$$

This shows that the smaller is the bandwidth, the smaller is $\alpha$, therefore the longer is the duration of $f(t)$. As already indicated above, a digitalization of the filter requires weighting operations to be carried out on the input signals. For a transversal type filter, the weighting factors are obtained by sampling the impulse response $f(t)$. The definition of the weighting factors of a recursive type filter is more complex, but the conclusions of the analysis remain applicable.

Function $f(t)$ sampled at frequency $F = 1/T$ becomes:

$$f(t)^* = f(t) \; x \sum_{n=-\infty}^{+\infty} \delta(t - nT)$$

where $\delta(t-nT)$ is the Kronecker symbol. $\delta(t-nT)$ is null for $t \neq nT$, and is equal to 1 for $t = nT$, $n$ being a whole number. To understand these notions, it is possible to refer to the various articles already published about the subject and, in particular, to the following articles: "z-Transforms and their Applications in Control Engineering" published by Y. Azar in "The Radio and Electronic Engineer" review of July, 1965: and "Programmable Digital Filter Performs Multiples Functions" published in the "Electronics" review of Oct. 26, 1970 (by A. T. Anderson).

Under these conditions, the transfer function of the filter is provided by the so-called transform-$z$ of $f^*(t)$, where $z = e^{pt}$.

This transfer function $H^*(z)$ is provided by the expression:

$$H^*(z) = \text{Real}\, A.e^{-j.\phi} \sum_{n=0}^{\infty} e^{-(\alpha + j\Omega) nTz - nT}$$

from which one can deduce by assuming $\alpha < 1$ $$H^*(z) = \text{Real}\,(A.e^{-j\phi})/(1 - e^{-(\alpha + j\Omega)T} x z^{-1})$$

$$H^*(z) = A[\cos\phi - \cos(\Omega T - \phi) \times e^{-\alpha T} \times z^{-1}]/[1 - 2e^{-\alpha T} \cdot \cos\Omega T \times z^{-1} - e^{-2\alpha T} \cdot z^{-2}]$$

The spectrum of $H^*(z)$ is obtained by substituting $e^{-j2\pi ft}$ for $z^{-1}$, which shows that the spectrum of the sampled signal is periodical in the frequency domain. This periodicity involves the re-appearance of the spectrum of the input analog signal around frequency F and each of its harmonics. Thus, it can be understood that certain information about the digital filter can be directly deduced from its impulse response $f(t)$. In particular, the curves shown in FIG. 1 show that if the filter which has $f(t)$ as impulse response is realized in digital mode, the accuracy of the response defined by the factors is better when T is smaller and $\alpha$ higher (for stability conditions, $\alpha$ is always lower than 1). In addition, whatever the sampling frequency of the impulse response may be, the filter may be realized by using the same number of factors.

The problem to be solved is that of obtaining the accuracy of the filtering definition without requiring the use of a high number of weighting factors. The problem becomes more complex when the filter to be made should have a bandwidth relatively narrow with respect to the signal spectrum. In effect, the narrower the bandwidth of the filter, then the lower is $\alpha$ and the longer is its impulse response $f(t)$ for a determined threshold. In addition, the lower limit of the sampling frequency is defined by the Nyquist relation, $F_{min} = 2F_s$, with $F_s$ being the upper frequency of the spectrum of the signal to be filtered. Therefore, it is impossible to reduce $F = 1/T$ to a value lower than $F_{min}$. This invention proposes that this filtering be carried out in several steps, each step reducing the bandwidth of the signal, therefore $F_{min}$, which enables to increase the sampling period of $f(t)$.

Advantageously, it is then not necessary to modify either the number of weighting factors, or their values to obtain a narrower bandwidth of the filter. Therefore, the same filter can be re-used to obtain the required result.

Figure 2:
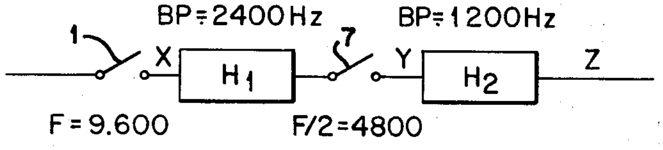
FIGS. 2 and 3 illustrate the invention process.

A concrete example will make the understanding of the process easier. Let us assume that one wants to extract a bandwidth of 1200 Hz from a signal, the spectrum of which extends to $F_s = 4800$ Hz. According to the Nyquist relation, the minimum sampling frequency is $F = 9600$ Hz. The number of significant weighting factors (i.e., after truncating $F(t)$ ) obtained by sampling the impulse response of a filter of 1200 Hz bandpass at the frequency of 9600 Hz is too high for an implementation of the filter using integrated circuits. Thus, it is advantageous to filter the signal at 2400 Hz a first time, which allows to reduce the Nyquist frequency from 4800 Hz to 2400 Hz and then, to transmit this signal to a filter having a bandwidth equal to 1200 Hz. This is schematically shown in FIG. 2: samples X of the initial signals are at frequency $F = 9600$ Hz at the input of a filter $H_1$ having a bandpass of 2400 Hz (the bandpass is only considered for the positive frequencies). The signal filtered by $H_1$ is resampled at a frequency $F/2 = 1/2T = 4800$ Hz, then it is filtered by $H_2$ 1200 Hz bandwidth, to supply the wanted resulting signal Z. The two filters $H_1$ and $H_2$ impulses responses $f_1(t)$ and $f_2(t)$ of which respectively sampled every T and every 2T, have the same number of weighting factors. However, $H_1$ will be defined better than $H_2$ since it has a bandwidth two times larger and is sampled at a frequency twice the one of $H_2$.

In fact, this disadvantage may be avoided by defining the response $f_2(t)$ by using its homothetic relationship with $f_1(t)$.

This may be illustrated by a simple example, using a pseudo passband filter more particularly deduced from expressions (1), (2), and (3). In this case, the simplest transfer function would be:

$$H(p) = (\alpha + p)/[(p+\alpha)^2 + \Omega^2]$$

from which $$f_1(t) = Ae^{-\alpha t} \cos \Omega t. \tag{4}$$

and $$f_2(t) = Ae^{-\alpha t/2} \cos 2\, t. \tag{5}$$

by sampling $f_1(t)$ at regular intervals $t=kT$ and $f_2(t)$ at intervals $t=2kT$ where $k = 1, 2, 3 \ldots$, one obtains the same weighting factors for both responses. Therefore, filter $H_2$ can be very easily obtained from a filter $H_1$ the time scale of which is extended by two.

Referring now to FIG. 1, there is shown functions $f_1(t)$ and $f_2(t)$ of expressions (4) and (5), respectively sampled at frequency $F = 1/T$ and $F/2 = 1/2T$. This figure illustrates the graphical relationship existing between the two responses. It can be concluded that filter $H_1$ can perform function $H_2$ perfectly, provided however that the time scale has been extended by a factor of 2. Now, the digital filter may be a convolutor constituted of a delay line and of weighting and accumulating stages. Said delay line is provided with taps separated by T for filter $H_1$, and by 2T for $H_2$. Therefore, to transform $H_1$ into $H_2$, it suffices to simulate a delay 2T between two consecutive taps of the delay line, in particular by causing the data of a same stage of delay T to recirculate, and by carrying out weighting and accumulating operations only one time out of two.

Figure 3:
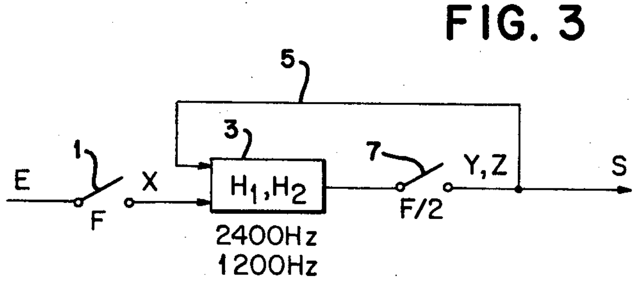

Then, the diagram of FIG. 3 may be substituted for the one of FIG. 2. Data X initially sampled at frequency F by switch 1 are filtered by $H_1$. Filtered signal Y is, in turn, sampled at F/2 by switch 7 and re-introduced into the same filter with an appropriate delay to avoid the interferences between input data X and re-introduced data Y. At this time the convolution involving the re-introduced data and $H_2$ will be performed. In fact, in a digital embodiment, to obtain Y at frequency F/2, it is enough to take only one sample out of two at the filter output.

The above described process may be repeated N times. Only the operating speeds of the circuits may restrict the number of recirculations which should be carried out between two provisions of samples X. The basic filter structure enables a very fast operating speed. These filters mainly consist of a Read Only Memory (ROM) addressed by the digital data passing through a delay line, and followed by an accumulator. In addition, the samplings on each passage may be done every $1/n$ samples. Finally, the bandwidth used, in fact, which is the one of $H_1$ may be $n^N$ times wider than the one of the required narrow band filter.

Figure 4:
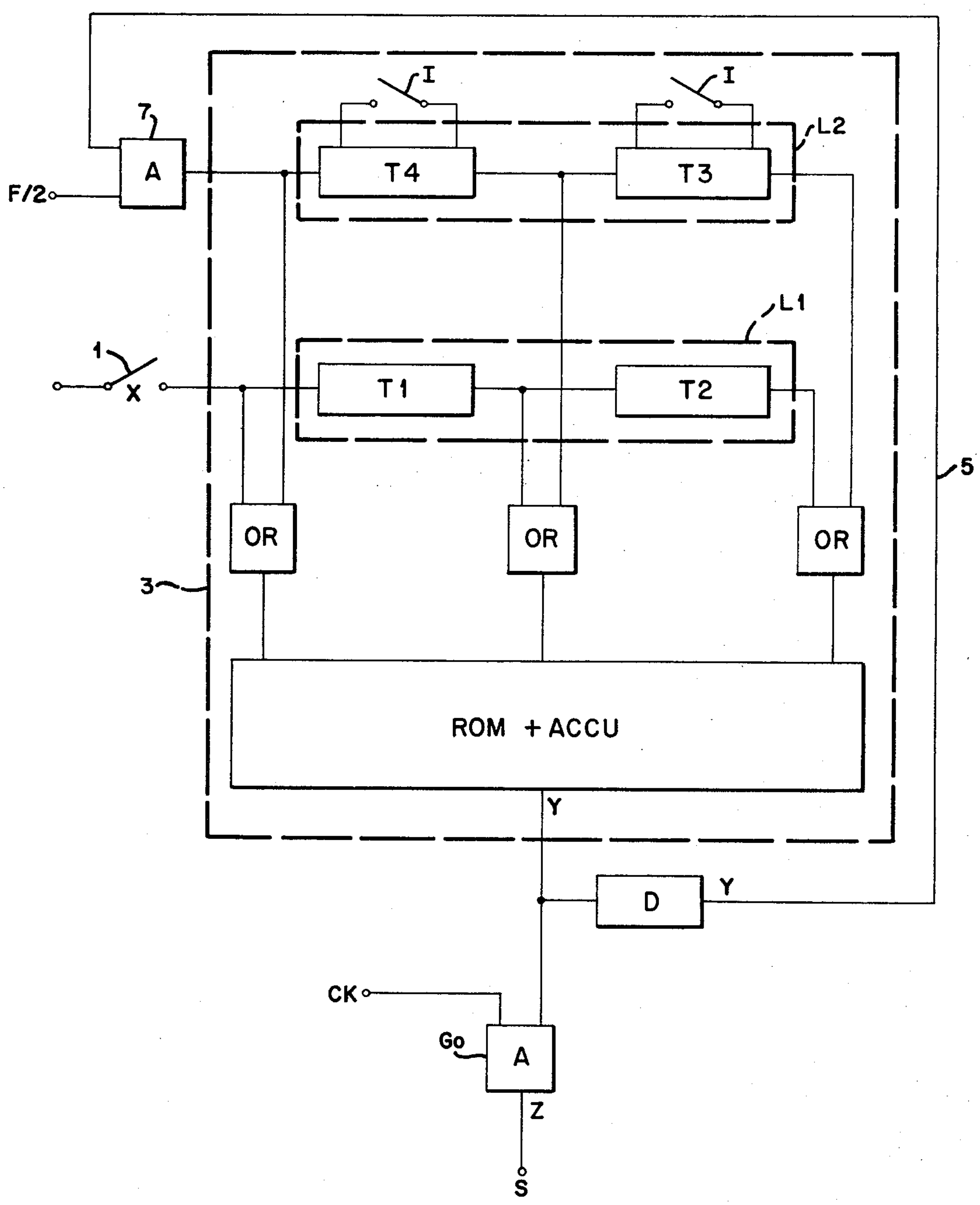
FIG. 4 shows an embodiment of the device of this invention.

FIG. 4 shows one embodiment of the filter indicated above and provided for extracting 1200 Hz from the signal extending to 4800 Hz by means of a data recirculation. Digital samples (delta modulated) X, provided every T seconds, are introduced into delay line L1. The digital sample signals address, through OR logic circuits, an ROM followed by an accumulator ACCU supplying digital samples Y (delta modulated). At this time, gate $G_0$ is blocked by signal CK. Consequently, digital samples Y are not transmitted to output S of the filter. They are supplied back to the input of a delay line L2 through an element D, delaying them by one fraction of T.

Gate 7 opened at frequency F/2 allows the passage of only one sample Y out of two. Samples Y passing through G are introduced into L2 constituted of delay elements T which can be internally re-looped on themselves by using switches I. These reloopings are performed every 2T, when gate G is closed: the purpose of this is to transform delay elements T of line L2 into actual delay elements 2T. This provides the extension of the time scale as indicated above. Therefore, when 7 is opened every 2T, the ROM is addressed by L2 and the accumulator supplies a sample Z of the desired filtered signal. The process is started again when the following sample X is provided and so on. The operations are carried out in time, for an initial signal defined by five samples $X_1$ to $X_5$ as indicated in the table that follows:

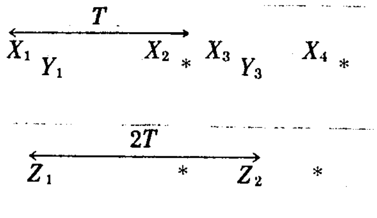

| Times | L1 and L2 contents | ROM + ACCU Output |
|---|---|---|
| t=0 | $X_1$** | → $Y_1$ |
| | $Y_1$** | → $Z_1$ |
| T | $X_2X_1$* | → * not used |
| (I closed, therefore relooping of $Y_S$) | $Y_1$** | → * not used |
| 2T | $X_3X_2X_1$ | → $Y_3$ |
| | $Y_3Y_1$* | → $Z_2$ |
| 3T | $X_4X_3X_2$ | → * not used |
| (relooping of $Y_S$) | $Y_3Y_1$* | → * not used |
| 4T | $X_5X_4X_3$ | → $Y_5$ |
| | $Y_5Y_3Y_1$ | → $Z_3$ |
| 5T (no more samples X) | 1 $X_5X_4$ | → * not used |
| (relooping of Y) | $Y_5Y_3Y_1$ | → * not used |
| 6T | 0 0 $X_5$ | → $Y_7$ |
| | $Y_7Y_5Y_3$ | → $Z_4$ |
| 7T | 0 0 0 | → 0 |
| relooping of Y | $Y_7Y_5Y_3$ | → * not used |
| 8T 0 0 0 0 | | → 0 |
| | 0 $Y_7Y_5$ | $Z_5$ |
| | | etc. . .until there is no more samples Y |

Figure 5:
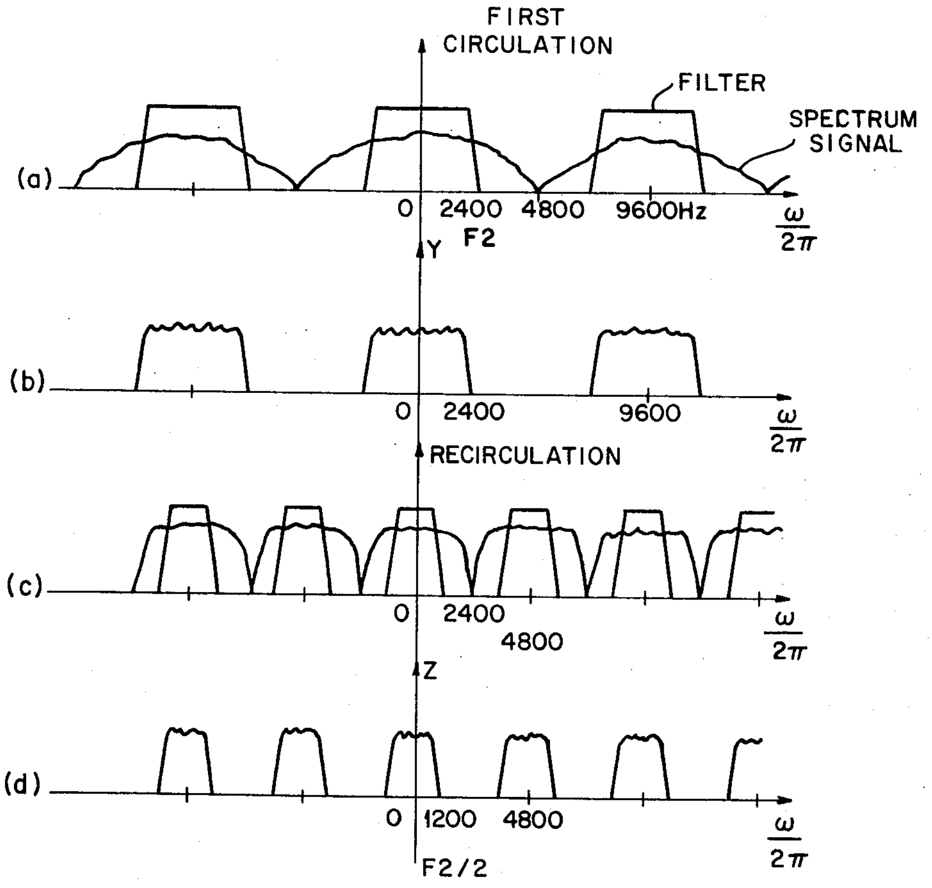
FIGS. 5 and 6 show phenomenons involved by this invention in the frequency domain.

FIG. 5 illustrates, in the frequency domain, the phenomenon of the filtering so performed in the case of a low pass filter after a recirculation. Line (*a*) shows the spectra of the signal and of the filter sampled at 9600 Hz. Line (*b*) shows the result on signal Y. Lines (*c*) and (*d*) respectively show the effect of the sampling at the half frequency and of the recirculation on the filter and no filtered signal Z.

Figure 6:
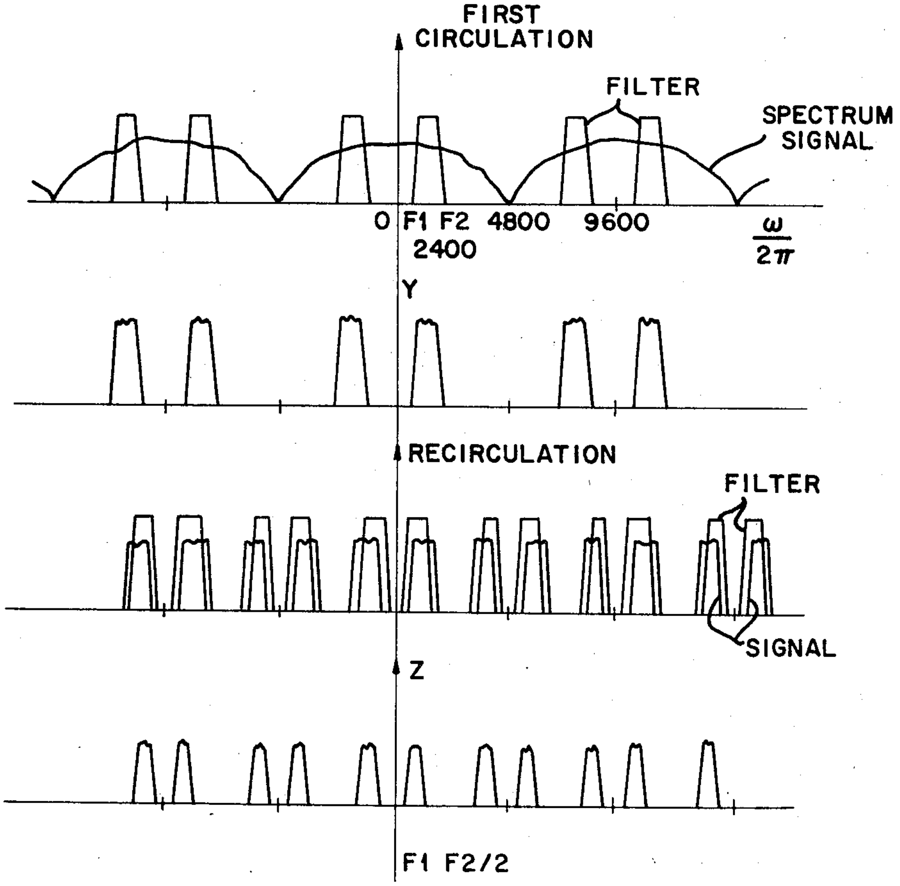

FIG. 6 illustrates, in the frequency domain, the phenomenon of the filtering so realized in the case of a passband filter.

The bandwidth of the digital filter F2–F1 much exceeds the one of the simulated digital filter in a ratio of :

$$G = \frac{F2 - F1}{F2/n^N - F1}$$

In the case shown here, $F2 = 3F1$, $n = 2$, $N = 1$, therefore passband gain $G = 4$.

This condition may involve a certain number of problems, in particular due to the fact that the lobes of the spectrum of signal Z obtained, sampled at a frequency equal to four times the Nyquist frequency, come closer, to each other in the frequency domain. Briefly, the lobe spacing can be ensured by increasing the sampling frequency of the filtered signal, in particular to bring it back to F. This increase is obtained by repeating and recirculating the same samples. The filter made for this purpose is, in its principle, entirely similar to the one shown in FIG. 3 of this application, but the sampling rate variation order is reversed.

While there has been described what are, at present, considered to be the preferred embodiments of the invention, it will be understood that various modifications may be made therein, and it is intended to cover in the appended claims all such modifications as fall within the true spirit and scope of the invention.

What is claimed is:

1. A narrow band digital filter comprising:

digital filter means (3);

means (1) for applying digital sequences to the filter means at a digit rate F; and means (5, 7) for sampling the digital filter means output sequence responsive to the associated input sequence at a frequency $F_i$ and for recirculating the output sequence and reapplying it to the filter, there being N such successive recirculations, the sampling frequency for the $i^{th}$ circulation being $F_i = F/n^i$ where $i = 1, 2, 3, \ldots N$, and n being any positive real integer.

2. A narrow band digital filter according to claim 1, wherein the digital sequences first applied to the filter means input represent analog signals sampled at twice the Nyquist rate; n being equal to two.

3. A narrow band digital filter comprising:

digital filter means (FIG. 4) including:

a Read Only Memory (ROM);

first (L1) and second (L2) delay elements;

a logic arrangement (OR, ACCU) for addressing the Read Only Memory at locations determined by the contents of either the first or second delay elements and for serially reading out the memory address contents;

means (1) for applying digital sequences to the first delay element at digit rate F;

means (D, 5, 7) for sampling the serially read out memory contents at a frequency $F_i$ and for applying said sampled digital sequence to the second delay element, there being N samplings, the sampling frequency $F_i$ at the $i^{th}$ sampling being $F_i = F/n^i, = 1, 2, \ldots N$, and $n$ being an arbitrary real positive integer, each sampled sequence being applied to the second delay element further being displaced D seconds from the application of digits into the first delay element, the interval D being sufficien to avoid overlap.

* * * * *